July 9, 1940.  C. H. H. RODANET  2,207,414
GYROSCOPIC HORIZON ALLOWING THE READING OF GREAT LONGITUDINAL INCLINATIONS
Filed Sept. 28, 1938   3 Sheets-Sheet 1
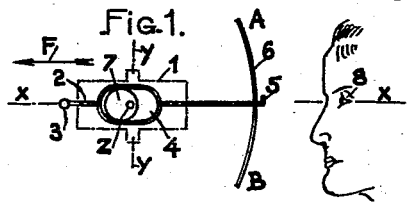
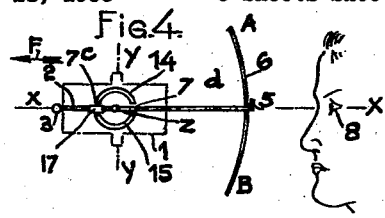
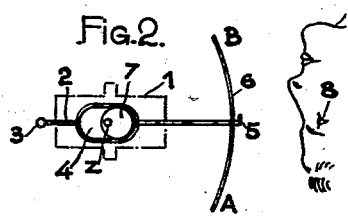
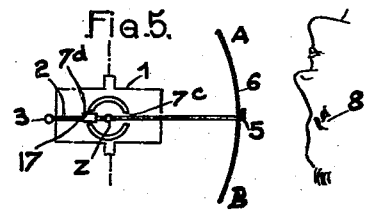
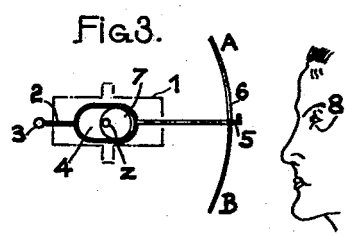
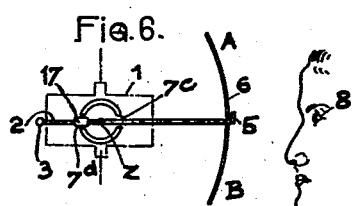
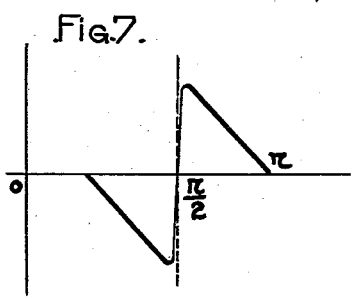
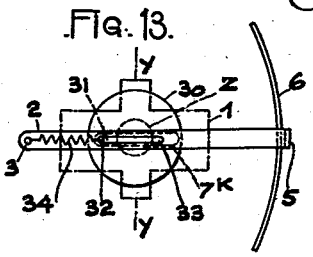
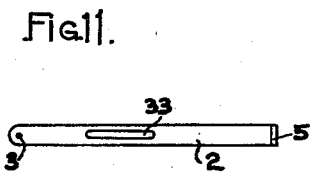
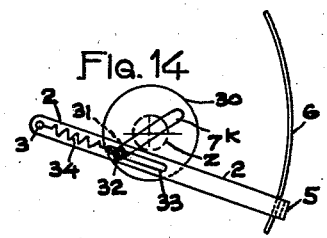
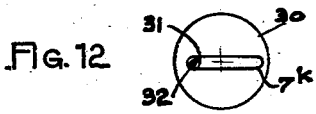
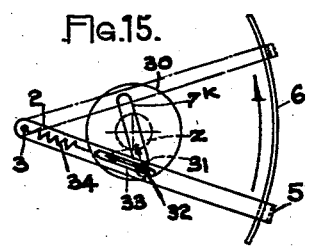
INVENTOR:
CHARLES HILAIRE
HENRI RODANET
BY Haseltine, Lake & Co.  ATTORNEYS July 9, 1940.  C. H. H. RODANET  2,207,414
GYROSCOPIC HORIZON ALLOWING THE READING OF GREAT LONGITUDINAL INCLINATIONS
Filed Sept. 28, 1938  3 Sheets-Sheet 3

INVENTOR:
CHARLES HILAIRE
HENRI RODANET
BY: Haseltine, Lake & Co.
ATTORNEYS

Patented July 9, 1940

2,207,414

UNITED STATES PATENT OFFICE 2,207,414

GYROSCOPIC HORIZON ALLOWING THE READING OF GREAT LONGITUDINAL INCLINATIONS

Charles Hilaire Henri Rodanet, Neuilly-sur-Seine, France, assignor to Société Anonyme: Jaeger - Aviation, Levallois - Perret (Seine), France Application September 28, 1938, Serial No. 232,140
In France October 20, 1937

6 Claims. (Cl. 33—204)

The problem has already been set down of establishing gyroscopic horizons which do not get out of order during aerobatics such as the figures so-called "loopings" or "horizontal spinnings," and it has been solved. Gyroscopic horizons even exist which continue to operate after so-called "Immelmann" turnings which consist in effecting a half-turn every successive execution of a half-looping and of a half-horizontal spinning; but these apparatus do not allow of reading great longitudinal inclinations, the index leaving the reading zone after a displacement of the order of 45°. In the apparatus allowing the reading of great longitudinal inclinations, the index is carried by a lever having a groove, an eccentric journal rigid with the outer ring of the gyroscope engaging in said groove. This arrangement, for reasons which will be explained later on, has the effect of rendering the gyroscope useless after an Immelmann turn, the indications being then reversed. The invention has for object to provide a gyroscopic horizon allowing the reading of great longitudinal inclinations, and which, moreover, allows the execution of the aerobatics consisting in the succession of a rotation of 180° about a horizontal axis perpendicular to the direction of advance (half-looping) and of a rotation of 180° about the longitudinal axis (half-horizontal spinning).

It will also be noted that, when flying with visibility, the pilot effecting a half-looping when rising sees successively the natural horizon:
— lowering relatively to him,
— disappearing towards the lower part of his face,
— reappearing towards the upper part of his face (the ground up, the sky down, relatively to his position in space),
— and coming back again in front of his eye when lowering (the ground up, the sky down, relatively to his position in space).

When flying without visibility, it is therefore necessary that the artificial horizon should:
— lower,
— disappear downwardly,
— reappear upwardly,
— lower again to come back to its normal position.

The improvements according to the invention, which give a solution of the problem previously indicated, relate to an artificial horizon of the gyroscopic type allowing, moreover, the reading of great longitudinal inclinations, that is to say comprising, in particular, an index carried by a gearing down lever pivoted on a member mounted so as to freely rotate about an axis parallel to the longitudinal axis of the airplane and which constitutes a support for the horizontal transverse suspension axis of the gyroscope.

In its general principle, the invention consists in combining with the gearing down lever, means rigid with the transverse suspension axis of the gyroscope and which, in normal position for horizontal flight, are symmetrical both relatively to the transverse axis and to the vertical plane passing through this axis so that, after a displacement of the airplane of 180° about a horizontal axis perpendicular to the direction of advance followed by a rotation of 180° about the longitudinal axis, any subsequent displacement of the lever should be correctly effected.

The means, symmetrically arranged both relatively to the transverse suspension axis of the gyroscope and to the vertical plane passing through this axis, can be of any type whatever, electric, magnetic, mechanical, hydraulic, pneumatic or other means.

A particularly advantageous embodiment is characterized by the fact that these means are arranged in a vertical plane perpendicular to the transverse suspension axis of the gyroscope and are constituted by two permanent magnets having substantially the shape of two half-circumferences of the same radius, co-axial and symmetrically arranged relatively to a horizontal diameter, a bar made of soft iron, rigid with the lever being arranged opposite the air-gap or polar space the nearest to the pivotal point of said lever.

In another embodiment, of the mechanical type, the symmetrically arranged means, as previously indicated, are constituted by a groove provided in a plate controlled by the gyroscope and in which engages a roller the spindle of which is guided in a longitudinal groove formed in the lever carrying the horizon, the spindle being restored in the direction of the pivotal point by a light spring.

Another improvement consists in neutralizing one of the magnetic fields created between the poles of reverse name of these magnets, poles which are placed opposite each other, through the medium of a fixed screen.

In a form of construction the fixed screen is constituted by a small plate arranged opposite the polar space the farthest from the pivot pin of the lever carrying the indicating pointer.

The accompanying drawings illustrate, on the one hand, a known apparatus and, on the other hand, by way of example only, improved apparatus according to the invention.

Figs. 1, 2 and 3 diagrammatically illustrate a known artificial horizon, these figures showing the position of the various members respectively: in horizontal flight, after a rotation of 180° about a horizontal axis perpendicular to the direction of advance, and after a rotation of 180° about the longitudinal axis of the airplane.

Figs. 4, 5 and 6 diagrammatically illustrate an artificial horizon improved according to the invention, these figures respectively corresponding to Figs. 1, 2 and 3.

Fig. 7 is a diagram.

Figs. 11 and 12 are diagrammatic details of a mechanical embodiment according to the invention.

Fig. 13 is a diagrammatic elevation of this mechanical embodiment.

Figs. 14 and 15 are views corresponding to Fig. 13, but in two successive positions during the ascent for effecting a half-looping.

Figure 8:
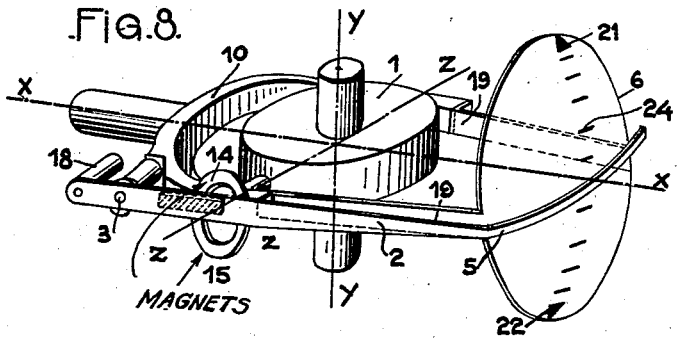
Fig. 8 is a general perspective view of a practical embodiment of the gyroscopic artificial horizon diagrammatically illustrated in Figs. 4, 5 and 6.

In a known embodiment, more particularly illustrated in Figs. 1, 2 and 3, the gyroscope 1 rotates about a vertical axis YY in a first support, pivotally mounted in a second support about an axis ZZ perpendicular to the axis YY. This second support is freely journalled about an axis XX parallel to the longitudinal axis of the airplane with which it is rigid, the axis XX being perpendicular to the axis ZZ.

A lever 2, pivotally mounted about a pin 3 on the second support, is provided with an oblong port 4 and carries a reference mark or arcuate bar 5 which moves opposite a spherical cap 6 rigid with the second support.

An eccentric 7, fast on the axis ZZ rigid with the first support, is engaged in the oblong port 4.

In normal horizontal flight, the eye of the pilot being located at 8, the various members occupy the position illustrated in Fig. 1, the airplane moving in the direction of the arrow F.

When the pilot causes the airplane to effect a rotation of 180° about a horizontal axis, perpendicular to the direction F of advance (half-looping), the various members occupy, after such a displacement and relatively to the eye 8 of the observer, the position illustrated in Fig. 2. In this position, the upper and lower parts A and B of the cap 6 are reversed, the eccentric 7 and the port 4 having been subjected to a relative displacement of 180°.

The pilot then effecting a rotation of 180° about the longitudinal axis of the airplane (half-horizontal spinning) the various members come to the position illustrated in Fig. 3.

It will be noted that, in said Fig. 3, the eccentricity of the eccentric 7 relatively to the pivot pin 3, is arranged in reverse direction to that it occupied in Fig. 1.

In these conditions, an ascent or descent of the airplane will be translated, relatively to a reference silhouette, by a rising or lowering of the horizon bar 5 whereas this bar ought to move in the reverse direction.

The present invention allows of overcoming this difficulty and the improved apparatus always gives exact indications independently of the nature of the evolutions of the airplane.

The apparatus diagrammatically illustrated in Figs. 4, 5 and 6, which substantially correspond to Figs. 1, 2 and 3 will now be described.

In this embodiment, on the axis Z are rigidly mounted two arcuate permanent magnets 14 and 15 arranged according to one and the same circumference on either side of a horizontal diameter, the air-gaps being indicated at 7ᶜ and 7ᵈ. On the balanced lever 2, pivotally mounted at 3 and carrying the horizon bar 5, is mounted a bar made of soft iron 17.

In normal position for horizontal flight, the various members occupy the position illustrated in Fig. 4, the eye of the pilot being located at 8 and the airplane moving in the direction of the arrow F.

When the pilot causes the airplane to effect a rotation of 180° about a horizontal axis perpendicular to the direction F of advance (half-looping), the various members occupy, after such a displacement and relatively to the eye 8 of the observer, the position illustrated in Fig. 5, the soft iron bar 17 is now located, no longer opposite the air-gap 7ᶜ, but opposite the air-gap 7ᵈ. In these conditions, any further displacement of the airplane will be correctly indicated. In fact, if from the position indicated in Fig. 5, the pilot then effects a rotation of 180° about the longitudinal axis of the airplane (half-horizontal spinning), the various members come to the position illustrated in Fig. 6 which exactly corresponds to Fig. 5.

As indicated in the preamble, if the pilot effects a half-looping when rising during flight without visibility, it is necessary that the artificial horizon should lower, disappear downwardly, reappear upwardly and again lower to return to its normal position. Consequently, referring to Fig. 7, and by marking in ordinates the successive positions of the artificial horizon opposite its graduation, a curve must be obtained having the aspect indicated in said Fig. 7.

There is therefore discontinuity at $$\frac{\pi}{2}$$

this discontinuity is obtained by the apparatus diagrammatically illustrated in Figs. 4, 5 and 6. In fact, for a displacement slightly greater than $$\frac{\pi}{2}$$

of the airplane (quarter of looping when rising) the air-gap 7ᶜ has come to the lower part and the air-gap 7ᵈ to the upper part and, as soon as the movement continues, the lever 2, which had lowered, for causing the reference mark 5 to lower and disappear downwardly, is suddenly restored upwardly and then again progressively lowered when the other quarter of the looping is terminated.

The industrial embodiment illustrated in Figs. 8, 9 and 10 will now be described, embodiment the diagram of which is given in Figs. 4, 5 and 6.

This apparatus comprises a gyroscope 1 which rotates about a vertical axis YY in a first support pivotally mounted in a second support 10 about an axis ZZ, perpendicular to the axis YY. This second support is freely journalled, about an axis XX, in a third support 11 rigid with the airplane, the axis XX being parallel to the longitudinal axis of said airplane. On the axis Z are rigidly mounted the two arcuate permanent magnets 14 and 15, the air-gaps being indicated at 7ᶜ and 7ᵈ.

On the support 10 is pivotally mounted, about a spindle 3, the lever 2 carrying the horizon bar 5 and the soft iron bar 17, lever 2 being balanced by a counterweight 18.

On the support 10 is also mounted, through the medium of arms 19, a spherical cap 6 comprising two reference marks 21 and 22 constituted by slits, a horizontal silhouette 23 of an airplane and graduations 24 and 25 connecting the reference marks 21 and 22 according to a vertical diameter.

Moreover, opposite either simply the reference mark 21, or both the reference marks 21 and 22, are arranged graduations 26 carried by an annular plate 27 secured on a casing 28 rigid with the airplane, a protecting glass plate being provided at 29.

Figure 9:
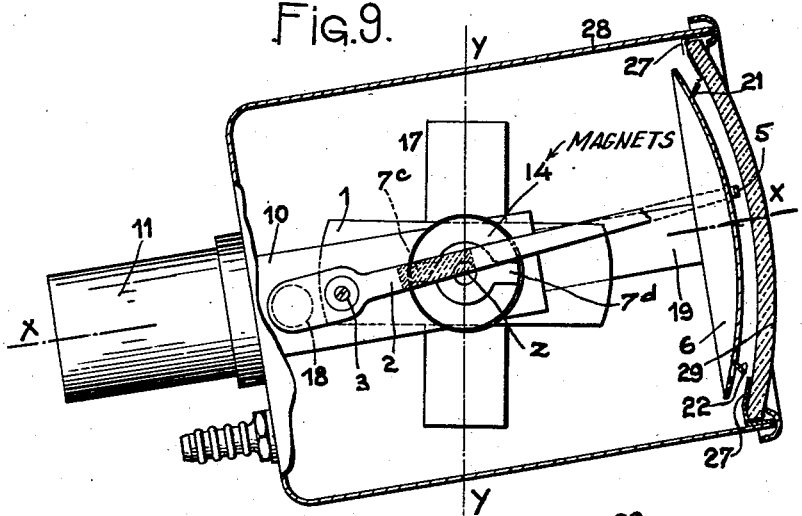
Fig. 9 is a general elevation with partial vertical section of the apparatus illustrated in the preceding figure, the airplane slightly nose-diving.
Figure 10:
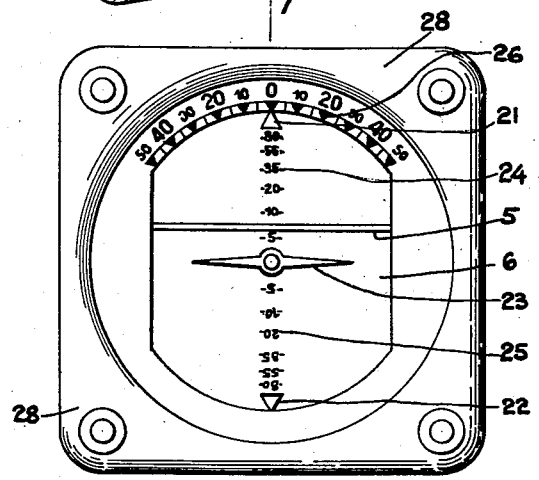
Fig. 10 is a front view of the apparatus.

In Figs. 9 and 10, the airplane is illustrated descending, the horizon bar 5 being in this case located above the silhouette 23.

The operation of this artificial horizon of the gyroscopic type is identical to that described with reference to Figs. 4, 5 and 6. If the airplane takes a descending position, the various members occupy the position illustrated particularly in Figs. 9 and 10. If the airplane effects successively a rotation of 180° about a horizontal axis perpendicular to its direction of advance and a rotation of 180° about its longitudinal axis, the unit comprising the casing 28 is moved so that the soft iron bar 17 is now located no longer opposite the air-gap 7ᶜ, but opposite the air-gap 7ᵈ. In these conditions, any further displacement of the airplane will be correctly indicated. In case of a lateral inclination, the casing inclines with its graduation 26 relatively to reference marks 21—22 which always remain in a vertical plane.

If the silhouette 23 is traced on the cap 6, in case of a lateral inclination of the airplane, said silhouette remains parallel to the horizon bar 5, the indication of lateral inclination being given solely by the reference mark 21 and the graduation 26. On the contrary, if the silhouette 23 is traced on the glass plate 29, rigid with the casing 28 rigidly secured to the airplane, the indication of inclination is given not only by the reference mark 21 and the graduation 26, but also by the relative angular position of the silhouette 23 and the horizon bar 5. The arrangement of the silhouette 23 on the glass plate 29 seems to be preferable.

It will be noted that the support of the gyroscope can take all positions relatively to the frame without ever abutting against the latter. Whatever may be the position of the airplane, the axis of the gyroscope always remains vertical. The rectifying system (secondary pendulum or the like), ensuring or re-establishing the perfect verticality of the axis of the gyroscope, acts only for correcting very small variations due to the friction of the pivotal joints. In known devices, on the contrary, in which use is made of abutments, the rectifying system takes a relatively long time to re-establish perfect verticality, which is a serious inconvenience.

Another embodiment will now be diagrammatically described which constitutes a mechanical solution giving all the technical effects of the magnetic embodiment illustrated in Figs. 8, 9 and 10.

This mechanical embodiment, shown in Figs. 11 to 15, comprises a plate 30 rigidly secured on the axis Z and in which is provided an oblong port 7ᵏ. In this port is engaged a roller 31 the spindle 32 of which is guided in a longitudinal groove 33 formed in the lever 2 pivotally mounted at 3 and carrying the reference horizon mark 5. The axis Z is restored, in the direction of the axis 3, by a light spring 34 mounted at its ends on both axes.

In normal position for horizontal flight (Fig. 13) the grooves 7ᵏ and 33 coincide. During change of inclination in elevation, the relative displacement between the plate 30 and the pivot pin 3 of lever 2 causes an angular displacement of lever 2 about its axis (Fig. 14). This displacement is effected in antagonism to the action of the light spring 34 which is progressively tensioned. When the pilot effects a half-looping, slightly after a rotation of $$\frac{\pi}{2}$$

(and not just at $$\frac{\pi}{2}$$

because of friction), the spring 34 relaxes (see Fig. 15) and compels the horizon to effect the required discontinuity indicated in Fig. 7.

Figure 16:
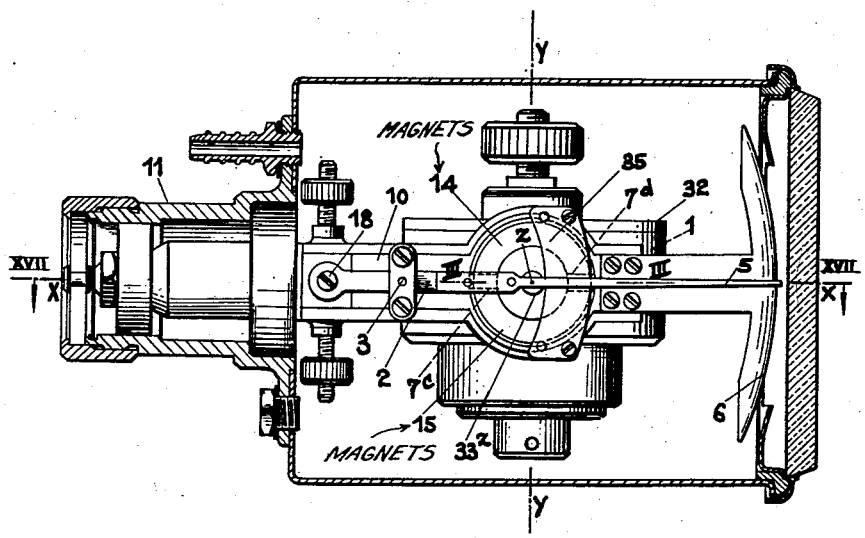
Fig. 16 is a general longitudinal elevation of another embodiment, the casing being sectioned according to line XVI—XVI of Fig. 17.
Figure 17:
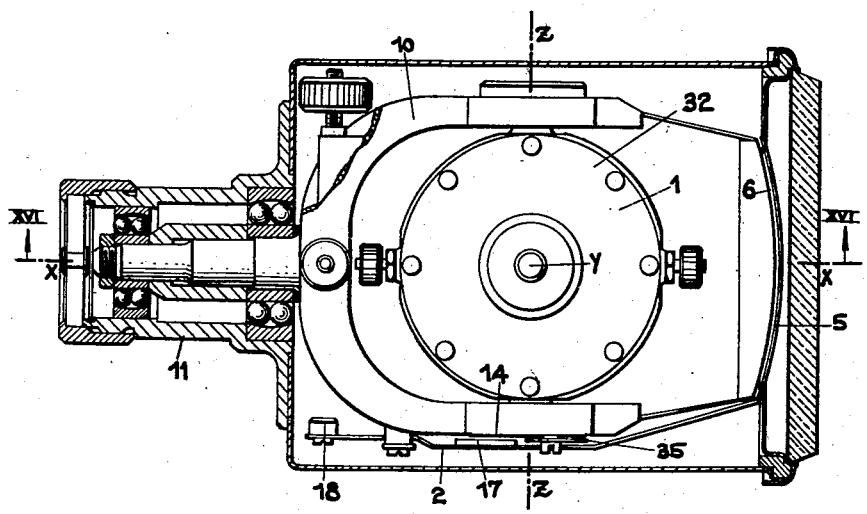
Fig. 17 is a plan view corresponding to the preceding figure, the casing being sectioned according to line XVII—XVII of this figure.
Figure 18:
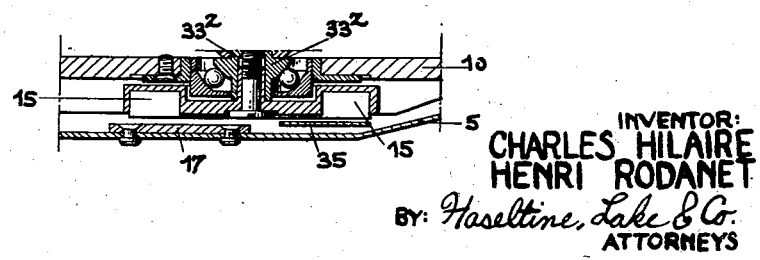
Fig. 18 is a section, on an enlarged scale, made according to line XVIII—XVIII of Fig. 16.

Figs. 16, 17 and 18 relate to a modification of the apparatus illustrated in Figs. 8, 9 and 10.

This modification comprises a gyroscope 1 the rotor of which is arranged in a fluid-tight casing 32. The rotor rotates about an axis Y—Y which tends to coincide with the vertical of the place over which the airplane is flying. Said axis Y—Y is mounted in the fluid-tight casing 32 which constitutes a first pivoted support, in a second support 10, about an axis Z—Z, perpendicular to Y—Y and to the longitudinal axis of the airplane. This second support is freely journalled about an axis X—X in a third support 11 rigid with the airplane, the axis X—X being parallel to the longitudinal axis of said airplane. On the axis 33ᶻ, which materializes the axis Z—Z, are rigidly mounted the two arcuate permanent magnets 14 and 15, the air-gaps being indicated at 7ᶜ and 7ᵈ.

The lever 2, carrying the indicating pointer 5, is pivotally mounted on a spindle 3 rigid with the support 10, the unit formed by the lever and the pointer being balanced by a counterweight 18. The lever 2 carrying the pointer 5 is controlled, as indicated, by the two magnets 14 and 15 in the shape of half-rings. The poles of reverse names of these magnets are placed opposite each other and, in the two intervals 7ᶜ and 7ᵈ, exist two magnetic fields which can act on a bar or blade made of soft iron 17 secured on the lever 2.

According to the present invention, one only of the magnetic fields acts at a time on the bar 17, the other being neutralized by a fixed screen 35 carried by the support 10.

By this device is obtained a smooth and accurate actuation of the lever 2 and consequently, of the pointer 5, the latter indicating on the cap 6 forming dial, all the relative positions which may be assumed by the axis of the gyroscope relatively to the support 10.

It is to be noted, particularly, that this absence of mechanical connection, in addition to the advantages previously mentioned, assemblage by universal joint of the gyroscope and impossibility for the latter to abut against the fork or support 10 which supports it, allows the airplane to effect all aerobatics (loopings, horizontal spinnings, Immelmann turns) without the axis of the gyroscope departing from the vertical and by always giving correct indications, which constitutes an appreciable progress over existing apparatus.

What I claim as my invention and desire to secure by Letters Patent is:

1. In a gyroscopic horizon for airplanes and of the type comprising a gyro casing provided with a transverse shaft, a fork journalled parallel to the longitudinal geometrical axis of the airplane the arms of said fork constituting bearings for said transverse shaft arranged at right angles to the longitudinal geometrical axis of the airplane, in combination: a lever mounted on the fork of the gyro casing by means of a pivot the geometrical axis of which is parallel to the geometrical axis of the transverse shaft, a plate secured on the transverse shaft, means for producing between said lever and the plate a connecting force the point of application of which on the lever is always located for all positions of the craft about its transverse axis on one and the same side of an imaginary plane containing the geometrical axis of the transverse shaft and at right angles to the imaginary plane determined by said geometrical axis of the transverse shaft and the geometrical pivotal axis of the lever.

2. In a gyroscopic horizon for airplanes and of the type comprising a gyro casing provided with a transverse shaft, a fork journalled parallel to the longitudinal geometrical axis of the airplane the arms of said fork constituting bearings for the said transverse shaft arranged at right angles to the longitudinal geometrical axis of the airplane, in combination: a lever mounted on the fork of the gyro casing by a pivot the geometrical axis of which is parallel to the geometrical axis of the transverse shaft, a soft iron bar rigid with said lever, and two arcuate permanent magnets rigid with said transverse shaft having their ends separated to form air gaps normally lying in a horizontal plane, said soft iron bar being arranged adjacent the air gap normally nearest the pivot of said lever.

3. In a gyroscopic horizon for airplanes and of the type comprising a gyro casing provided with a transverse shaft, a fork journalled parallel to the longitudinal geometrical axis of the airplane the arms of said fork constituting bearings for the said transverse shaft arranged at right angles to the longitudinal geometrical axis of the airplane, in combination: a lever mounted on the fork of the gyro casing by a pivot the geometrical axis of which is parallel to the geometrical axis of the transverse shaft, a soft iron bar rigid with the said lever, and two arcuate permanent magnets in the form of two half-circumferences having the same radius, co-axial and symmetrically arranged relatively to a horizontal geometrical plane passing through the geometrical axis of the transverse shaft having their ends separated to form air gaps normally lying in a horizontal plane, said magnets being arranged on either side of said plane and being rigid with said shaft, said soft iron bar being arranged adjacent the air gap normally nearest the pivot of said lever.

4. In a gyroscopic horizon for airplanes and of the type comprising a gyro casing provided with a transverse shaft, a fork journalled parallel to the longitudinal geometrical axis of the airplane the arms of said fork constituting bearings for the said transverse shaft arranged at right angles to the longitudinal geometrical axis of the airplane, in combination: a lever mounted on the fork of the gyro casing by means of a pivot the geometrical axis of which is parallel to the geometrical axis of the transverse shaft, said lever being provided with a horizon bar movable opposite a graduation traced on a spherical cap rigid with said fork, a soft iron bar rigid with said lever, and two arcuate permanent magnets in the form of two half-circumferences having the same radius, co-axial and symmetrically arranged relatively to a horizontal geometrical plane passing through the geometrical axis of the transverse shaft having their ends separated to form air gaps normally lying in a horizontal plane, said magnets being arranged on either side of said plane and being rigid with said shaft, said soft iron bar being arranged adjacent the air gap normally nearest the pivot of said lever.

5. In a gyroscopic horizon for airplanes and of the type comprising a gyro casing provided with a transverse shaft, a fork journalled parallel to the longitudinal geometrical axis of the airplane the arms of said fork constituting bearings for the said transverse shaft arranged at right angles to the longitudinal geometrical axis of the airplane, in combination: a lever mounted on the fork of the gyro casing by a pivot the geometrical axis of which is parallel to the geometrical axis of the transverse shaft, said lever being provided with a horizon bar movable opposite a graduation traced on a spherical cap rigid with said fork, a soft iron bar rigid with said lever, two arcuate permanent magnets in the form of two half-circumferences having the same radius, co-axial and symmetrically arranged relatively to a horizontal geometrical plane passing through the geometrical axis of the transverse shaft having their ends separated to form air gaps normally lying in a horizontal plane, said magnets being arranged on either side of said plane and being rigid with said shaft, said soft iron bar being arranged adjacent the air gap normally nearest the pivot of said lever, and a screen rigid with said fork for neutralizing one of the magnetic fields created between the poles of opposite sign of said magnets.

6. In a gyroscopic horizon for airplanes and of the type comprising a gyro casing provided with a transverse shaft, a fork journalled parallel to the longitudinal geometrical axis of the airplane the arms of said fork constituting bearings for the said transverse shaft arranged at right angles to the longitudinal geometrical axis of the airplane, in combination: a lever mounted on the fork of the gyro casing by means of a pivot the geometrical axis of which is parallel to the geometrical axis of the transverse shaft said lever being formed with a first groove, a plate rigid with said transverse shaft and formed with a second horizontal groove symmetrical relatively to the geometrical axis of said transverse shaft, a roller simultaneously engaging both said first groove and said second groove, a shaft for rotatably receiving said roller, and a spring urging said shaft and roller in the direction of the pivot of said lever.

CHARLES HILAIRE HENRI RODANET.